US012295087B2

(12) United States Patent
Linev et al.

(10) Patent No.: US 12,295,087 B2
(45) Date of Patent: May 6, 2025

(54) SHIELDED X-RAY SOURCE WITH RADIATION SHIELDING AND COOLING SYSTEM

(71) Applicant: ADANI Systems, Inc., Alexandria, VA (US)

(72) Inventors: Vladimir N. Linev, Minsk (BY); Alexander Poleshchuk, Minsk (BY); Vitaly Yamniy, Minsk (BY)

(73) Assignee: Linev Systems, Inc., Alexandria, VA (US)

( * ) Notice: Subject to any disclaimer, the term of this patent is extended or adjusted under 35 U.S.C. 154(b) by 570 days.

(21) Appl. No.: 17/740,600

(22) Filed: May 10, 2022

(65) Prior Publication Data

US 2023/0371161 A1 Nov. 16, 2023

(51) Int. Cl.
*H05G 1/02* (2006.01)
*H01J 35/10* (2006.01)
*H01J 35/16* (2006.01)
*H05G 1/06* (2006.01)

(52) U.S. Cl.
CPC ........... *H05G 1/025* (2013.01); *H01J 35/106* (2013.01); *H01J 35/16* (2013.01); *H01J 2235/1204* (2013.01); *H01J 2235/1262* (2013.01); *H01J 2235/166* (2013.01); *H05G 1/06* (2013.01)

(58) Field of Classification Search
CPC ........ H05G 1/025; H01J 35/106; H01J 35/13; H01J 35/16; H01J 2235/1204; H01J 2235/1262; H01J 2235/166
See application file for complete search history.

(56) References Cited

U.S. PATENT DOCUMENTS

| | | | | |
|---|---|---|---|---|
| 4,157,476 A * | 6/1979 | O'Connor | H01J 35/16 | 378/156 |
| 2013/0114794 A1* | 5/2013 | Yamamoto | H05G 1/06 | 378/140 |
| 2014/0050305 A1* | 2/2014 | Zhao | H01J 35/13 | 378/141 |
| 2022/0259423 A1* | 8/2022 | Schroetz | C09D 5/033 | |

OTHER PUBLICATIONS

Acrylgiessen, "Polyester Resin—What is Poly Resin or Fiberglass Resin?", (Feb. 10, 2021), from the internet: <<https://web.archive.org/web/20210420035742/https://acrylgiessen.com/en/polyester-resin/>> (Year: 2021).*

* cited by examiner

*Primary Examiner* — Chih-Cheng Kao
(74) *Attorney, Agent, or Firm* — Bardmesser Law Group

(57) ABSTRACT

An X-ray source includes an X-ray tube; a radiation shielding shell enclosing the X-ray tube, the radiation shielding shell including a collimator formed integrally with it, wherein the radiation shielding shell comprises finely dispersed powder, polyester or epoxy resin and hardener; a cooler system providing oil to the X-ray tube; and an oil filled tank supplying the oil to the cooler system. There is a central shielding element shaped as a cylinder inside the radiation shielding shell and one or more end shielding elements around the X-ray tube. The central and end shielding elements are made of lead.

18 Claims, 3 Drawing Sheets

SHIELDED X-RAY SOURCE WITH RADIATION SHIELDING AND COOLING SYSTEM

BACKGROUND OF THE INVENTION

Field of the Invention

The present disclosure relates to X-ray radiating units and, in particular to X-ray sources that comprise an X-ray tube equipped with radiation shielding and a cooling system.

Description of the Related Art

An X-ray radiating units generates X-rays by generating electrons from a cathode electrode inside a vacuumed X-ray tube and accelerating the electrons in a direction of an anode electrode to which an acceleration voltage of several kV to several hundred kV is applied. A collision of the accelerated electrons with an anode electrode causes a production of X-rays with energy limited by a value of accelerating voltage. See, e.g., US20210166909.

There are several problems that limit a performance of X-ray radiating unit.

Due to a wide aperture of the X-ray emission a significant part of the produced radiation contributes into an undesirable radiation background. To reduce that radiation background, an X-ray source is usually equipped with plates of radiation shielding material, such as lead. However, this radiation shielding increases weight and cost of radiation unit. It is more efficient to shield just an X-ray tube; however, one cannot surround X-ray tube with conductive materials because it will provoke an electrical breakdown between anode and cathode electrodes through a conductive surface of the shielding. On the other hand, a use of non-metal materials as radiation shielding is not efficient due to weak absorption of X-rays in non-metals. Thus, it is necessary to use a high absorption non-conductive composite material.

Other problem are caused by an overheating of X-ray tube due to electrons current passing through anode part of an X-ray tube. To avoid overheating an X-ray tube must be installed into an embodiment filled with transformer oil. Transformer oil plays two roles: protect from electrical breakdowns inside X-ray radiation source and provides heat dissipation. However, an oil thermal conductivity is insufficient for efficient anode area cooling, so a forced oil circulation is necessary.

Transformer oil partly absorbs and provoke a scattering of X-rays emitting from X-ray tube. These effects are useful for radiation background reduction, however, harmful in a direction of X-ray output. A design of X-ray radiation source should provide minimal absorption and scattering of X-rays in direction of the unit output.

Accordingly, there is a need in the art for an X-ray source with better protection from background radiation while minimizing overall weight and size of the X-ray source.

SUMMARY OF THE INVENTION

The present disclosure provides a structure of an X-ray radiating unit equipped with X-ray tube, radiation shielding and cooler.

An embodiment of the inventive concept provides an X-ray radiating unit including: an X-ray tube; a radiation shielding shell with collimator that embodies an X-ray tube; a cooler system including oil pomp, oil input and output tubes; an oil filled tank that encases a radiation shielding shell and a cooler system.

In an embodiment, an X-ray tube is completely enclosed in a radiation shielding shell.

In an embodiment, a radiation shielding shell comprises nonconducting composite material.

In an embodiment, the radiation shielding shell comprises finely dispersed powder, polyester resin and hardener.

In an embodiment, the radiation shielding shell comprises finely dispersed powder, epoxy resin and hardener.

In an embodiment, the radiation shielding shell comprises finely dispersed powder of high dense and high Z material, for example, but not limited to, tungsten.

In an embodiment, the radiation shielding shell comprises preferably from one to four parts of finely dispersed powder and one part of polyester resin.

In an embodiment, the radiation shielding shell comprises preferably from one to six parts of finely dispersed powder and one part of epoxy resin.

In an embodiment, the radiation shielding shell comprises more than about 1.5 wt % and less than about 2.5 wt % of the hardener to the weight of polyester resin.

In an embodiment, the radiation shielding shell comprises more than about 40 wt % and less than about 60 wt % of the hardener to the weight of epoxy resin.

In an embodiment, the radiation shielding shell comprises central and one or more end radiation shielding elements.

In an embodiment, central and end radiation shielding elements comprises lead or other high efficient X-ray absorbing material.

In an embodiment, within the radiation shielding shell there is a central radiation shielding element that is shaped as a cylinder enclosing the central part of the X-ray tube.

In an embodiment, a central radiation shielding element has a slit opposite to a collimator slit.

In an embodiment, end radiation shielding elements have a shape of disk installed near front and back ends of the shielding shell.

In an embodiment, the end radiation shielding elements have holes for oil circulation, and the holes are misaligned relative to each other so that they don't form straight lines through which stray X-ray radiation can escape.

In an embodiment, a cooler system comprises oil pump, an oil input tube and an oil output tube.

In an embodiment, a radiation shielding shell and a cooler system are encased inside an oil filled tank.

In an embodiment, an oil input tube delivers cool oil from oil filled tank into anode side of a radiation shielding shell.

In an embodiment, an oil output tube delivers oil heated in the anode side of radiation shielding shell back to the oil filled tank.

In an embodiment, the oil output tube is spaced from the oil input tube to be as far away as possible.

In an embodiment, a collimator is formed as a single component with the radiation shielding shell.

In an embodiment, a collimation slit is filled with a plug preventing oil from filling it.

In an embodiment, a plug comprises X-ray low absorbing material, for example, but not limited to, plexiglass or carbon.

BRIEF DESCRIPTION OF THE ATTACHED FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF EMBODIMENTS OF THE INVENTION

Exemplary embodiment of the present invention will be described with reference to the accompanying drawings so as to sufficiently understand constitutions and effects of the present invention. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the accompanying drawings, the components are shown enlarged for the sake of convenience of explanation, and the proportions of the components may be exaggerated or reduced for clarity of illustration.

Unless terms used in embodiments of the present invention are differently defined, the terms may be construed as meanings that are commonly known to a person skilled in the art. Hereinafter, the present disclosure will be described in detail by explaining preferred embodiments of the invention with reference to the accompanying drawings.

Figure 1:
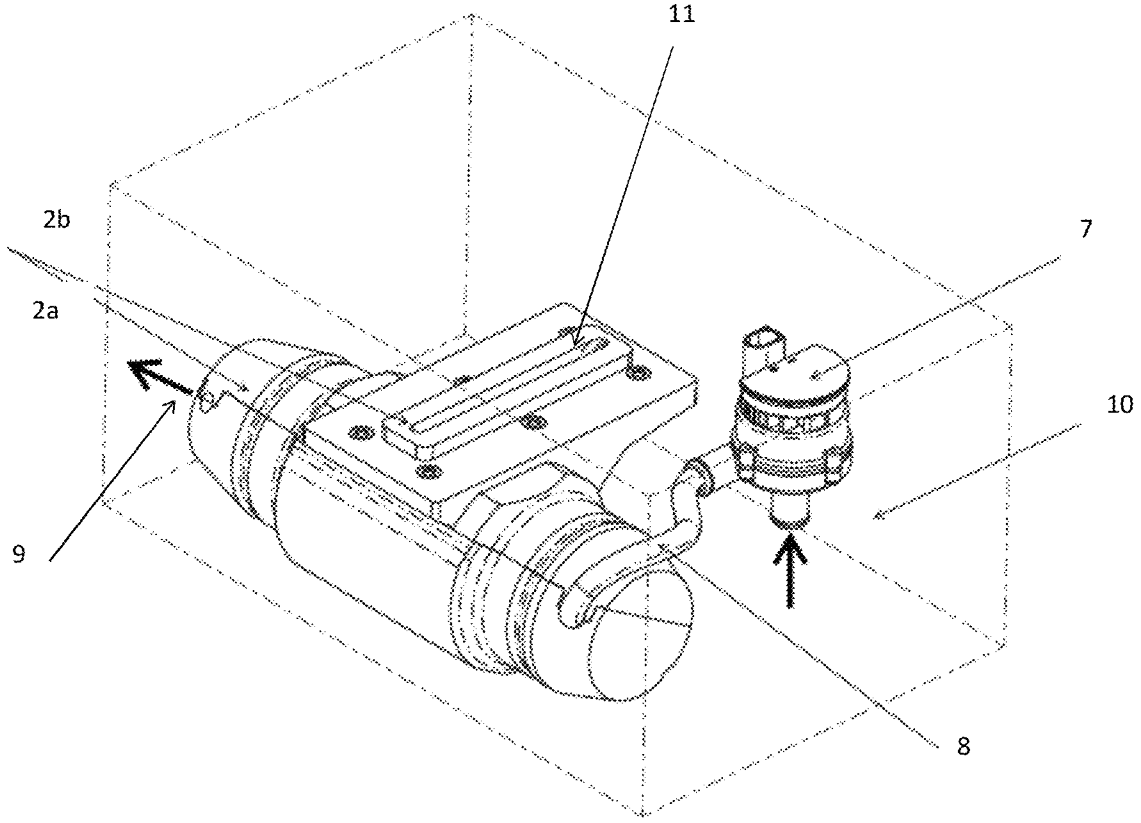
FIG. 1 is a 3D view illustrating a structure of an X-ray radiating unit according to one embodiment of the invention.

FIG. 1 is a 3D view illustrating a structure of an X-ray radiating unit according to an embodiment of the inventive concept.

Referring to FIG. 1, an X-ray radiating unit according to one embodiment of the inventive concept may include an X-ray tube 1 (shown in FIG. 2A and FIG. 2B) completely enclosed in a radiation shielding shell 2*a* with a collimator 2*b*, a cooler system comprising an oil pump 7, oil input tube 8 and output tube 9, and an oil filled tank 10 that encases a radiation shielding shell and a cooler system. A collimator 2*b* is formed as one piece with radiation shielding shell 2*a*. The oil input tube 8 delivers cool oil from oil filled tank into anode side of a radiation shielding shell. The oil output tube 9 delivers oil heated in the anode side of radiation shielding shell back to oil filled tank. An oil output tube 9 is located as far away from oil input tube 8 as possible.

Figure 2A:
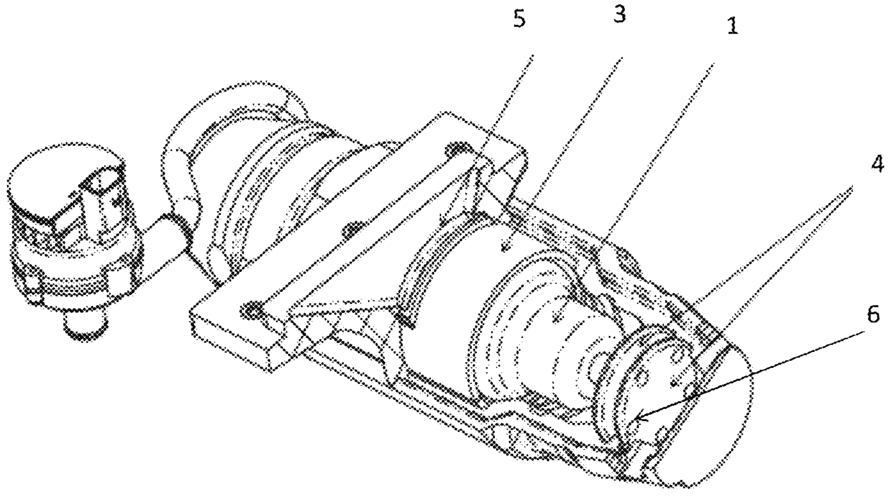
FIG. 2A is a cross-sectional 3D view illustrating a structure of an X-ray radiating unit according to one embodiment of the invention.
Figure 2B:
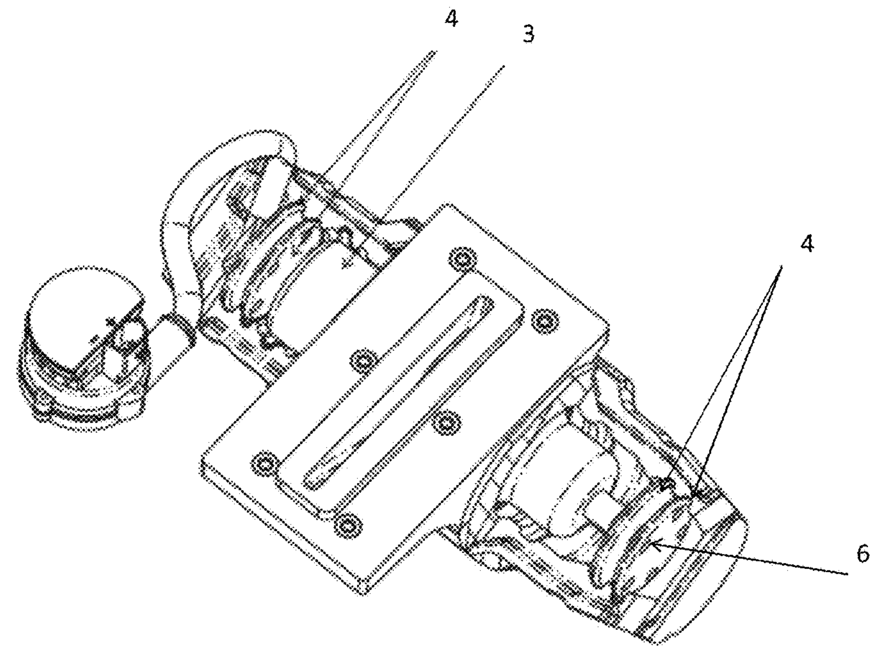
FIG. 2B is a cross-sectional 3D view illustrating a structure of an X-ray radiating unit according to one embodiment of the invention.

FIG. 2A and FIG. 2B are cross-sectional 3D view illustrating a structure of an X-ray radiating unit according to one embodiment. Referring to FIG. 2A and FIG. 2B a radiation shielding shell comprises central shielding element 3 and one or more end radiation shielding elements 4. The central radiation shielding element 3 has a shape of cylinder enclosing the central part of the X-ray tube 1. End radiation shielding elements 4 have a shape of disks installed near front and back ends of the shielding shell. The central radiation shielding element 3 has a slit 5 opposite of a collimator slit 11. End radiation shielding elements have holes 6 for oil circulation. The holes in neighboring end radiation shielding elements are shifted so that the holes don't form straight lines. The collimation slit 11 is filled with a plug preventing oil from filling it.

Figure 3A:
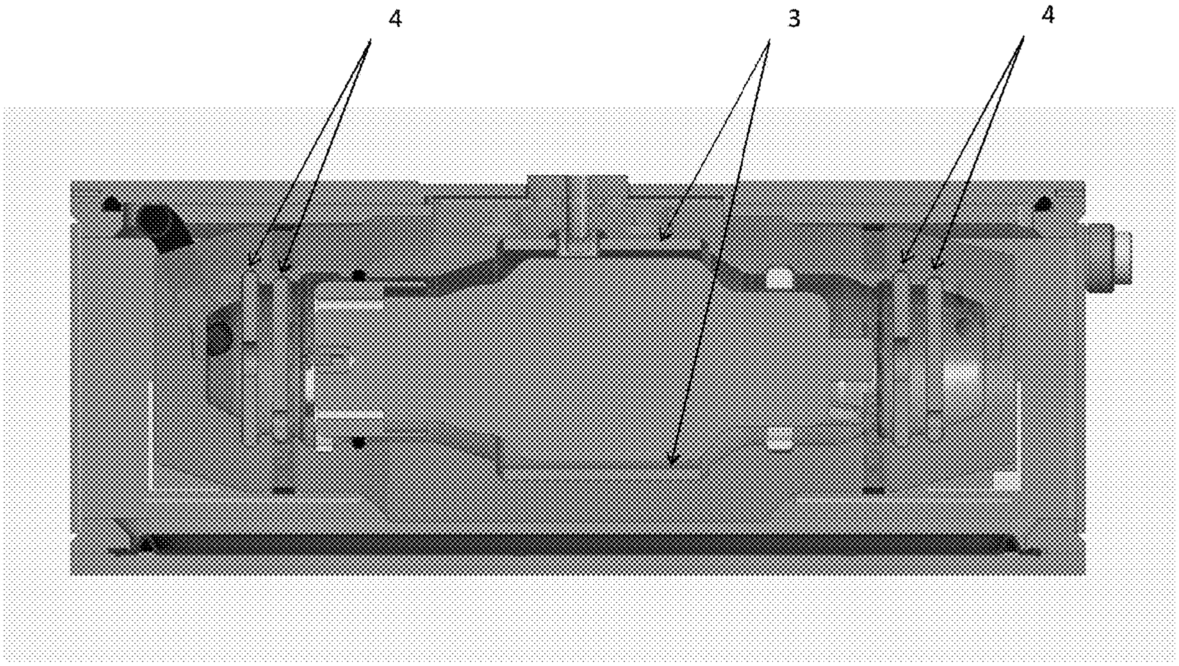
FIG. 3A is a cross-sectional view illustrating a structure of an X-ray radiating unit according to one embodiment of the invention.
Figure 3B:
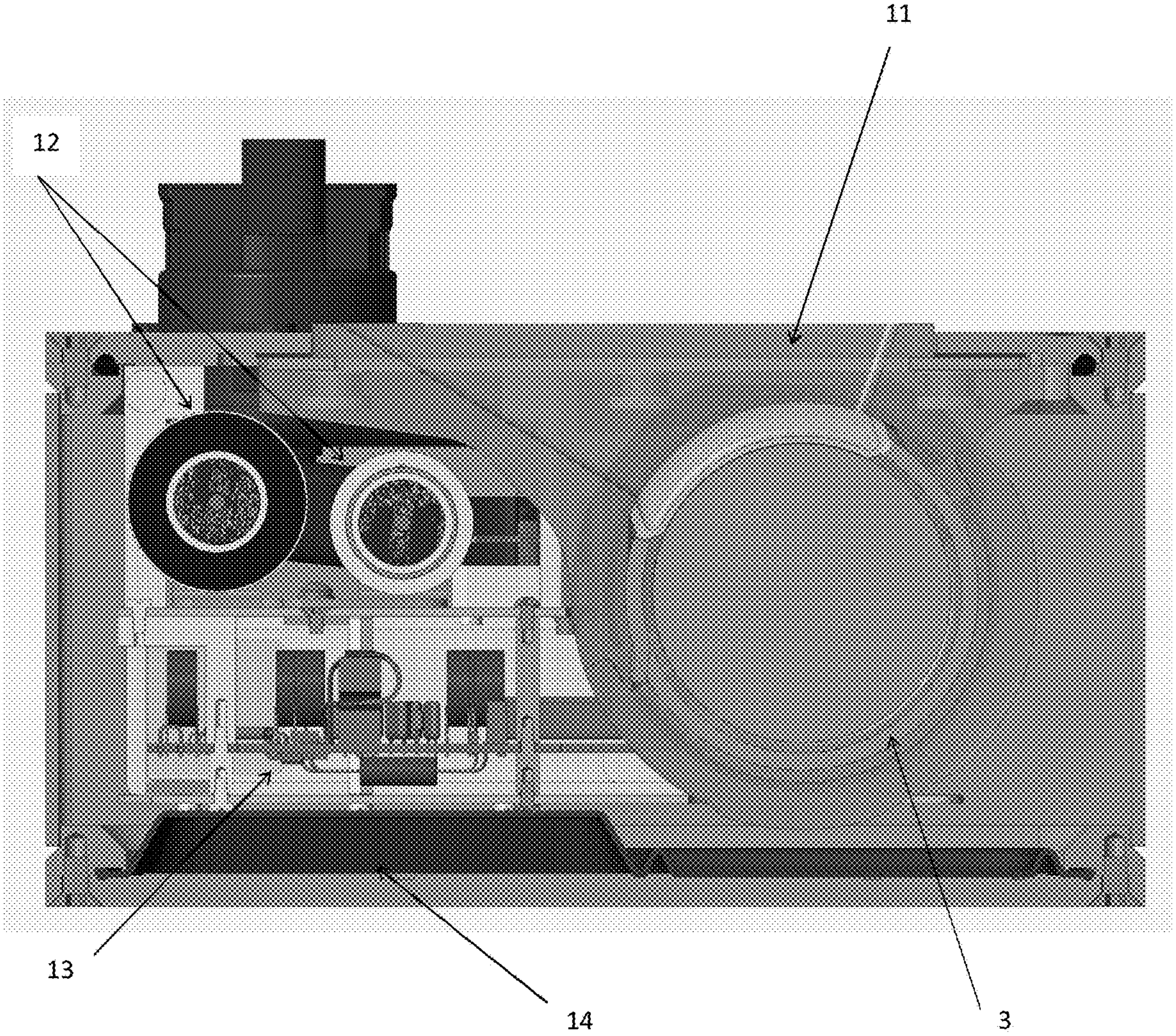
FIG. 3B is a cross-sectional view illustrating a structure of an X-ray radiating unit according to one embodiment of the invention.

FIG. 3A and FIG. 3B are cross-sectional view illustrating a structure of an X-ray radiating unit according to one embodiment. Referring to FIG. 3A and FIG. 3B the X-ray radiating unit comprises high voltage (HV) transformer(s) 12, an HV multiplier 13, and an expansion tank 14.

To reduce background radiation, the X-ray tube 1 is completely enclosed in a radiation shielding shell 2*a* with the collimator 2*b*.

The radiation shielding shell 2*a* with the collimator 2*b* is formed of nonconducting composite material that includes finely dispersed powder of some dense (from 5 g/cm$^3$ and higher) and high atomic number Z (from 60 and higher) material, for example, but not limited to tungsten, bounded by polyester resin, for example, but not limited to, DEPOL X-230 A (www.dugalak.com/images/pdf/ENG/depol_x-230a.pdf), a hardener, for example, but not limited to, Butanox M-50 (www.nouryon.com/product/butanox-m-50-methyl-ethyl-ketone-peroxide-solution-in-dimethyl-phthalate-cas-1338-23-4/). Particles of dense and high Z material are electrically insulated from each other by dielectric resin and the resulting composite does not conduct an electric breakdown.

Alternatively, the radiation shielding shell 2*a* with the collimator 2*b* is formed of nonconducting composite material that includes finely dispersed powder of a dense material (from 5 g/cm$^3$ and higher) and high atomic number Z (from 60 and higher) material, for example, but not limited to tungsten, bounded by epoxy resin, for example, but not limited to, YD-128 (httpswww.tri-iso.com/kukdo-epokukdo-yd-128.html), a hardener, for example, but not limited to, Etal-45M (httpsall.biz/hardener-etal-45m-g199757BY). Particles of dense and high Z material are electrically insulated from each other by dielectric resin and the resulting composite does not conduct an electric breakdown.

A proportion of preferably from one to four parts of finely dispersed powder and one part of polyester resin is chosen to provide high radiation absorption of the resulting composite without loss of mechanical strength.

A proportion of preferably from one to six parts of finely dispersed powder and one part of epoxy resin is preferred to provide high radiation absorption of the resulting composite without loss of mechanical strength.

A proportion of more than about 1.5 wt % and less than about 2.5 wt % of the hardener to the weight of polyester resin is chosen to provide a sufficient mechanical hardness of the radiation shielding shell with some elasticity, necessary to avoid crack during composite shrinkage.

A proportion of more than about 40 wt % and less than about 60 wt % of the hardener to the weight of epoxy resin is preferred to provide a sufficient mechanical hardness of the radiation shielding shell with some elasticity, necessary to avoid cracks during composite shrinkage.

The radiation absorption of the proposed composite is obviously smaller compared to the entire component being made of high Z metal, a supplemental shielding is provided by the central element 3 and several (precise number can vary) side shielding elements, formed of, for example, lead or other high efficient X-ray absorbing material.

The central radiation shielding element 3 can have a shape of cylinder enclosing central part of the X-ray tube and have a slit opposite to a collimator slit, so as to provide an output for the generated X-ray radiation into a desirable direction and through a desirable aperture.

End radiation shielding elements can have a shape of disks with radial holes to allow oil circulation through them. To prevent direct exit of an X-ray beam from X-ray tube through these holes, neighboring end shields are shifted (or misaligned relative to each other).

Due to a use of high voltage up to hundreds kilovolts, special measures against electric breakdown must be taken. To prevent electric breakdown either a gap between parts under electric tension must be increased or gaps must be filled with material of higher dielectric strength. The first solution can cause an increase in size, weight and cost of apparatus, so, a standard solution is to place the entire X-ray radiation unit into a tank filled with transformer oil.

The oil plays two roles: protect from electrical breakdowns and provides excess heat dissipation and cooling. There are many sorts of transformer oils however, only some of them are applicable for X-ray radiation units, because oil must have high breakdown voltage (preferable 70 kV or higher), be non-corrosive, chemically stable for a long time and in a wide temperature region. Also, appropriate transformer oil must be chemically and physically stable under ionizing radiation. For example, but not limited to, appropriate transformer oils are NYTRO® 10XN (see www.nortrafo.no/lastned.asp?Filnavn=nytro10xnseensds.pdf) and SHELL DIALA S4 ZX-I (tdc.ge/wp-content/uploads/2014/03/1_Diala S4_ZX-I.pdf).

Nevertheless with good thermal conductivity of transformer oils, to increase a cooling efficiency, it is necessary to force convection of oil inside tank by use of an oil pump. To maximize efficiency fresh oil must be delivered to the hottest part of the unit, i.e., to an anode side of the tube and then transported to an area with less heating, where hot oil can mix with cool one and dissipate heat outside from radiating unit.

Transformer oil between X-ray tube and output window of X-ray radiating unit provokes absorption and scattering of some part of X-rays, that cause an increase of background radiation and reduce a useful X-ray output. To avoid this effects a collimator slit is filled with a plug preventing oil to fill it. This plug comprises X-ray low absorbing material, for example, but not limited to, plexiglass or carbon.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

What is claimed is:

1. An X-ray source comprising:

an X-ray tube;

a radiation shielding shell enclosing the X-ray tube, the radiation shielding shell including a collimator formed integrally with it, wherein the radiation shielding shell comprises finely dispersed powder, hardener, and polyester resin or epoxy resin;

a first set of two coaxial discs made of a conductive material at an anode side of the radiation shielding shell and between the radiation shielding shell and the X-ray tube;

a second set of two coaxial discs made of the conductive material at a cathode side of the radiation shielding shell and between the radiation shielding shell and the X-ray tube;

a cylindrical shielding element inside the radiation shielding shell and around the X-ray tube, wherein the cylindrical shielding element is made of the conductive material;

a cooler system providing oil to the X-ray tube; and an oil filled tank supplying the oil to the cooler system.

2. The X-ray radiating source of claim 1, wherein the radiation shielding shell completely encloses the X-ray tube.

3. The X-ray radiating source of claim 1, wherein the radiation shielding shell comprises a non-conducting composite material.

4. The X-ray radiating source of claim 1, wherein the radiation shielding shell comprises between 1.5 wt % and 2.5 wt % of the hardener relative to a weight of the polyester resin.

5. The X-ray radiating source of claim 1, wherein the radiation shielding shell comprises between 40 wt % and 60 wt % of the hardener relative to a weight of the epoxy resin.

6. The X-ray radiating source of claim 1, wherein the finely dispersed powder has a density of at least 5 g/cm$^3$ and an atomic number Z of 60 or higher.

7. The X-ray radiating source of claim 1, wherein the radiation shielding shell comprises from one to four parts of the finely dispersed powder and one part of the polyester resin.

8. The X-ray radiating source of claim 1, wherein the radiation shielding shell comprises from one to six parts of the finely dispersed powder and one part of the epoxy resin.

9. The X-ray radiating source of claim 1, wherein the cylindrical shielding element includes lead or tungsten.

10. The X-ray radiating source of claim 9, wherein the cylindrical shielding element has a slit opposite of a collimator slit.

11. The X-ray radiating source of claim 10, wherein the collimation slit is filled with a plug.

12. The X-ray radiating source of claim 11, wherein the plug comprises an X-ray low absorbing material.

13. The X-ray radiating source of claim 1, wherein the discs have holes for oil circulation.

14. The X-ray radiating source of claim 13, wherein the holes in neighboring discs are shifted so as to misalign the holes.

15. The X-ray radiating source of claim 1, wherein the radiation shielding shell and the cooler system are encased in an oil filled tank.

16. The X-ray radiating source of claim 1, wherein the cooler system comprises an oil pump, an oil input tube and an oil output tube.

17. The X-ray radiating source of claim 16, wherein the oil input tube delivers cool oil from the oil filled tank to the anode side of the radiation shielding shell.

18. The X-ray radiating source of claim 17, wherein the oil output tube returns oil heated at the anode side of the radiation shielding shell to the oil filled tank.

* * * * *